United States Patent Office 3,539,896
Patented Nov. 10, 1970

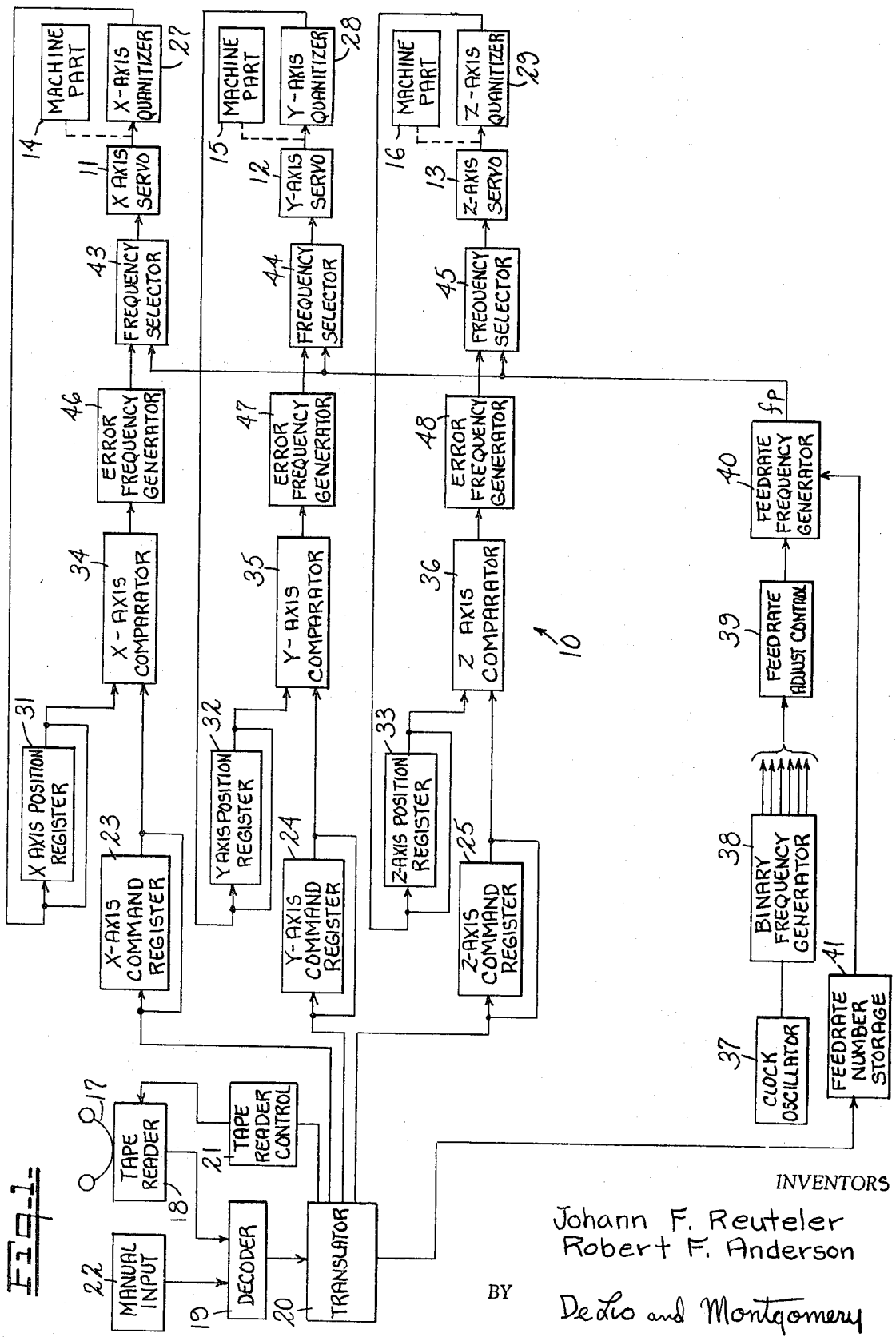

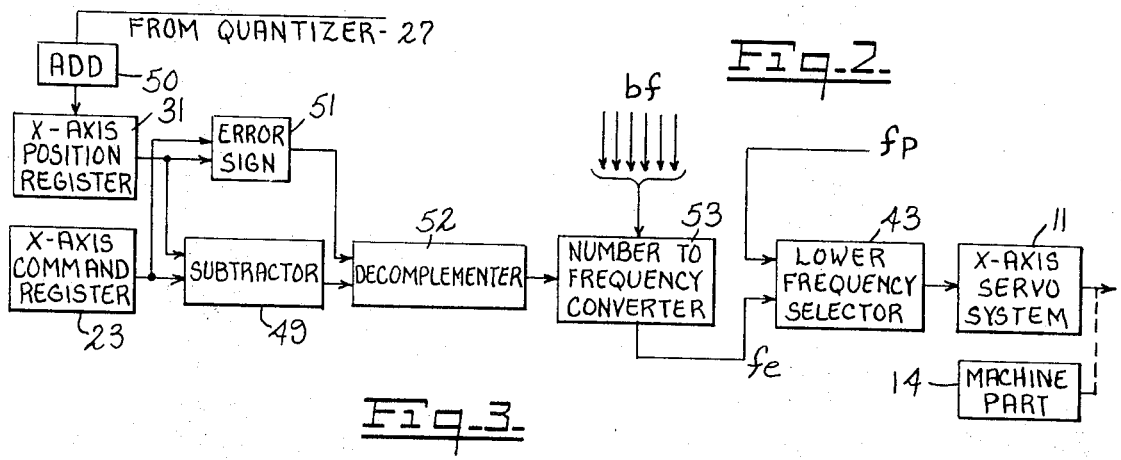
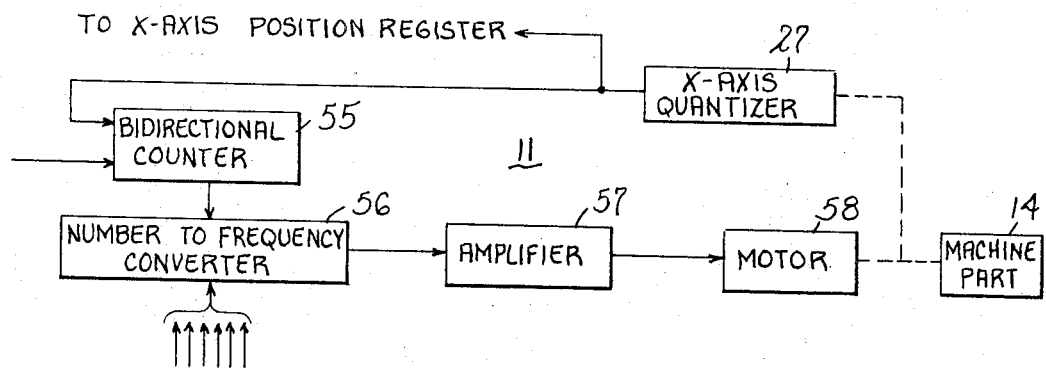
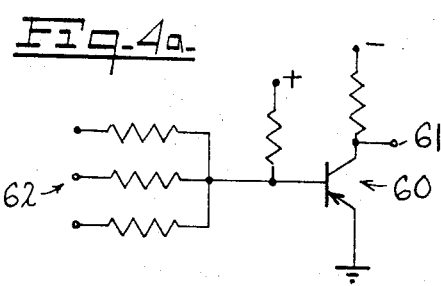
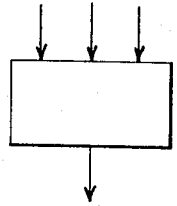
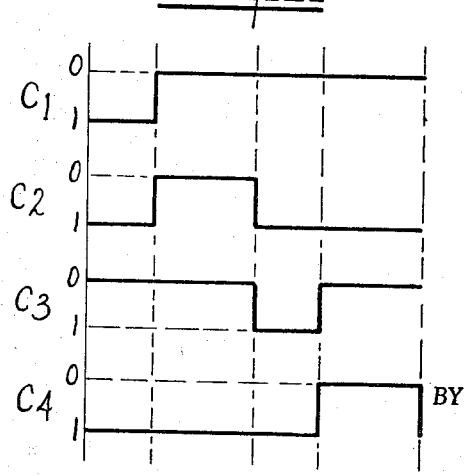
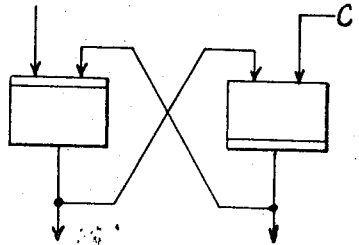

3,539,896
SERVOMECHANISM INCLUDING A FEED RATE COMPARATOR FOR A FREQUENCY SIGNAL PROPORTIONAL TO SYSTEM ERROR WITH A PROGRAMMED FREQUENCY
Johann F. Reuteler, Elmwood, Conn., and Robert F. Anderson, Rochester, N.Y., assignors to Pratt & Whitney Inc., West Hartford, Conn.
Filed Apr. 17, 1967, Ser. No. 631,275
Int. Cl. G05b *19/28*
U.S. Cl. 318—571    8 Claims

ABSTRACT OF THE DISCLOSURE

A numerical control system in which a substantially constant pulse frequency is generated in response to a programmed feedrate and a second pulse frequency proportional to the magnitude of the position error is generated. The two frequencies are compared and the lower frequency is applied to a pulse responsive servo system to move a controlled part a predetermined distance at a predetermined rate.

---

This invention relates to numerical control systems using pulse responsive servo systems to move a controlled part.

In numerically controlled machine tools, it is often desirable to move a cutting tool relative to a workpiece at a constant velocity between a starting point and a commanded end point. To effect such movement a train of pulses is applied to a pulse responsive servo system which moves the cutting tool and/or the workpiece at set velocities, commonly referred to as feedrate. When the cutting tool and/or the workpiece are moving relative at constant velocity, pulses are being supplied to the servo system at an essentially constant repetition rate or frequency. However, as the controlled part nears its commanded end position there is danger of the cutting tool overshooting the end point and making a longer length of cut than is desired. Accordingly, a numerical control system must contain a means for decelerating the relative motion of the cutting tool and the workpiece as the commanded end point is approached.

Accordingly, the present invention provides a new and improved numerical control system including a pulse responsive servo system wherein the controlled part is moved at a predetermined feedrate under the influence of a first pulse train until the end point is neared, and then control of movement is switched to a second pulse train having a decreasing frequency proportional to the existing position error so that the controlled part decelerates and accurately stops at the commanded end point.

An object of this invention is to provide a numerical control system having new and improved means for controlling the feedrate of a moving part, particularly as it approaches its end point of travel.

Another object of this invention is to provide a numerical control system in which a cutting tool is moved relative to a workpiece at a fixed feedrate between a starting point and a commanded end point by a first pulse train having a fixed frequency, and which is decelerated to a halt at the commanded end point under control of a second pulse train which has a decreasing frequency proportional to the decreasing position error as the controlled part approaches the commanded end point.

A further object of this invention is to provide new and improved means for selectively applying the lower frequency of two pulse trains to a pulse responsive servo system in order that the servo system will halt the motion of a controlled object at a commanded end point.

Briefly stated, the invention in one form thereof comprises a numerical control system arranged to move a controlled part a predetermined distance from an existing point to a commanded end point which includes a means for determining the existing position error between the actual position of the part and the commanded end position of movement, and further includes means for generating a train of pulses having a frequency proportional to the magnitude of the position error. Means are further provided for generating a second pulse train having a frequency proportional to the desired velocity or feedrate of movement of the controlled part. The two pulse trains are applied to a pulse responsive servo system through a frequency selective device which passes or generates a pulse train having the same frequency as the lower of the two frequencies applied thereto. In practice, when movement of the controlled part is first initiated a large position error is present and the first pulse train has a relatively high frequency. At this time, the fixed feedrate frequency will be lower and is applied to the pulse responsive servo system to effect movement of the controlled part at a constant feedrate. Then as the commanded end position is approached, the error frequency which is continuously being generated decreases below the feedrate frequency. At this time, the frequency selective network passes the error frequency which is decreasing to decelerate the controlled part to accurately stop it at the commanded end position.

The features of the invention which are believed to be novel are particularly set forth and distinctly claimed in the concluding portion of this specification. The invention, however, both as to its operation and organization, together with further objects and advantages thereof, may best be appreciated by reference to the following drawings, in which:

FIG. 1 is a diagram in block form of a numerical control system in which the invention may be embodied;

FIG. 2 is a diagram in block form of a comparator circuit to determine the position error and generate a frequency responsive thereto utilizing each axis of control;

FIG. 3 is a diagram in block form of a pulse responsive servo system;

Figure 6:
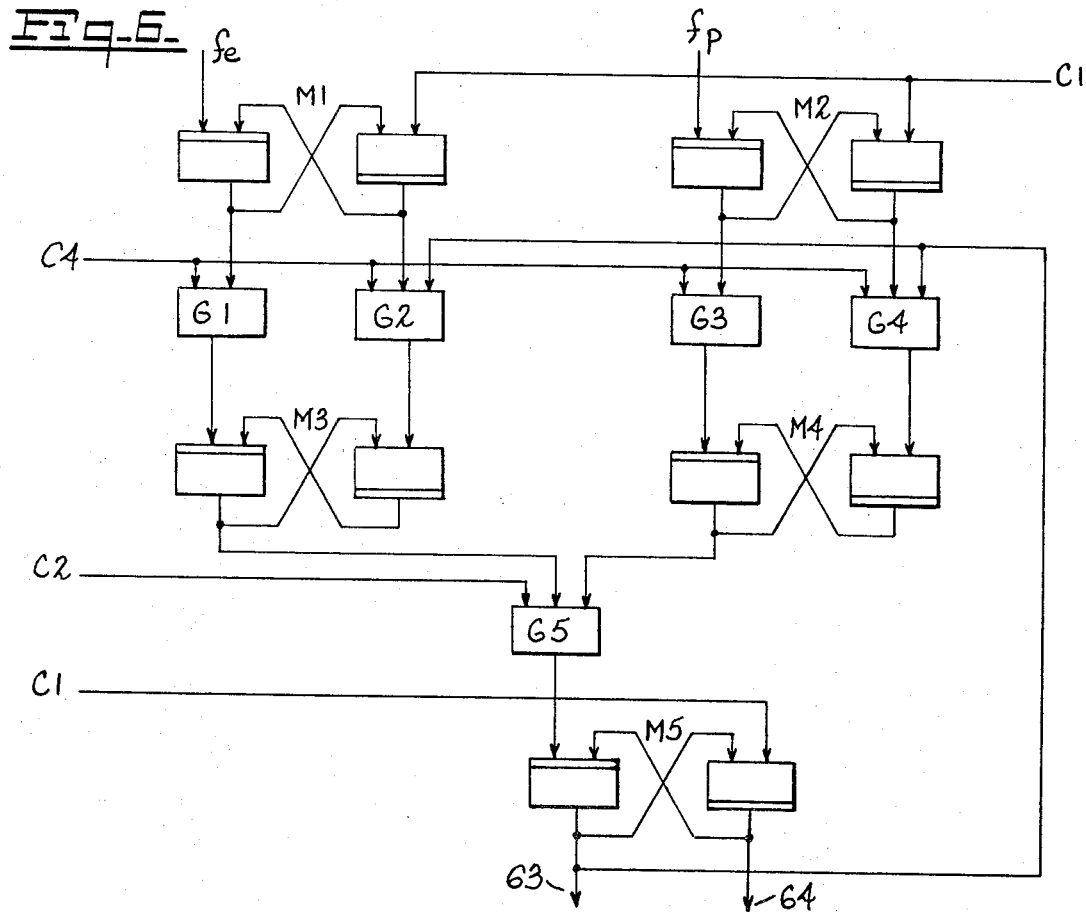

FIGS. 4a, 4b, and 4c are diagrams, partly schematic and partly in block form of a logic element and the block form respresentations thereof;

FIG. 5 is a graphic diagram of the waveforms of a clock oscillator showing one clock cycle thereof;

FIG. 6 is a schematic diagram of a lower frequency selecting network; and

Figure 7:
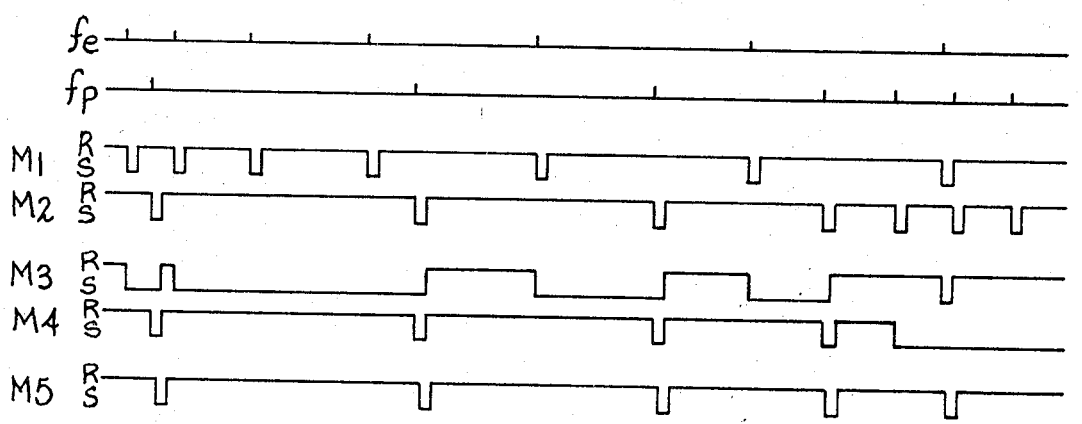

FIG. 7 is a graphic representation of the operation of the network of FIG. 6 showing the manner in which it generates or passes the lower frequencies of a pair of frequencies applied thereto.

Reference is now made to FIG. 1 which shows in block diagram a numerical control system 10 in which the invention may be embodied. Servo systems for each axis 11, 12 and 13, which include drive motors, move the machine parts 14, 15 and 16, respectively, one of which may be a milling tool.

In system 10 movement instructions are encoded on a tape 17 or other record medium, in binary or binary coded decimal form. Then, as each row or line on the tape is read by a tape reader 18, it is decoded by a decoder 19 and translated into pure binary form by translator 20. The operation of the tape reader 18, decoder 19 and translator 20 is coordinated and controlled by a tape reader control network 21, which tells the tape reader when to advance to read another block of information in response to signals from the decoder and translator. The reading, decoding and translating systems of the type set forth here are well known to those skilled in the art and need not be described in detail. The system may also have a manual input 22 for the machine operator to directly read the coordinates of a point into the system.

The commanded point for each axis is transmitted from translator 20 to command registers 23, 24 and 25. The commands are in the form of coordinates with respect to each axis and with respect to reference point 0. The coordinate points may be either plus or minus with respect to point 0. The X, Y and Z registers are recirculating binary registers which store a commanded position in the form of a coordinate point for the particular axis. When X, Y and Z servos move a machine part, quantizers 27, 28 and 29 generate discrete pulses, each indicative of a predetermined unit of distance along its respective axis. The quantizers are preferably of the electro-optical type as described in the co-pending application of Johann Reuteler and Robert Anderson, Ser. No. 577,891, filed Sept. 8, 1966, assigned to the same assignee as this application. The quantizer pulses are applied to X, Y and Z position registers 31, 32 and 33, respectively. The position registers contain in binary form the actual position of a part along a particular axis with respect to reference point 0. Both the command registers and position registers are preferably recirculating registers having the same number of binary digits (bits). For purposes of discussion it will be assumed that these registers all have sixteen bits, one of which indicates a numerical sign.

To control movement of each part along its respective axis, the actual position of the part as represented by the information in the position register is compared with the commanded point in the command register for that axis in comparators 34, 35 and 36. The resulting information in the comparators 34, 35 and 36 is indicative of the existing error between the actual position (as denoted by accumulated pulse counts in the position registers) of a particular machine part and the commanded position. The error signal is utilized to move the controlled part for that axis until the error diminishes to zero.

Such comparison takes place each recirculation cycle, which is a predetermined number, sixteen, of clock cycles.

A clock pulse generator or oscillator 37 generates timing signals or pulses at predetermined intervals as shown in FIG. 5, and such timing pulses are applied to all of the recirculating registers to produce a shift each clock cycle in a manner well known in the art. A schematic diagram of clock oscillator 37 is disclosed in the aforementioned co-pending application. The clock pulses from clock oscillator 37 are also applied to a binary frequency generator 38 which may comprise a counter chain of bistable multi-vibrators or flip-flops which operate between one of two stable states. The binary frequency generator of this type is well known to those skilled in the art and basically comprises a chain of flip-flops connected together as a counter. The noncarry pulses from each flip-flop are detected to produce a plurality of trains of pulses which have binarily related frequencies and which pulses occur at distinct time intervals so that none are overlapping in the various pulse trains. These pulse trains which may be designated as $bf_1-bf_{16}$ are applied to a feedrate adjust control 39 which may be of the type disclosed in co-pending application of Johann Reuteler, Ser. No. 349,215, filed Mar. 4, 1964, and assigned to the same assignee as the present invention. The feedrate adjust control which may be manually set by the machine operator is applied to a feedrate frequency generator 40. Feedrate frequency generator 40 may be in the form of a pulse rate multiplier which multiplies a pulse frequency from feedrate control 39 by a number received from a feedrate storage register 41 and yields a pulse frequency $f_p$ proportional to such multiplication. The feedrate number is applied to storage register 41 from translator 20. The feedrate number is predetermined on the tape input to command the rate of movement of the machine parts and particularly the relative movement of a cutting tool with respect to a workpiece.

Feedrate frequency generator 40 provides the pulse frequency $f_p$ which is determined by the feedrate number read from the tape and any manual override thereof made by the feedrate adjust control, and the programmed feedrate. This pulse frequency is applied to frequency selectors 43, 44 and 45 of each axis which select the lower of two pulse frequencies for application to the servo systems. The frequency selectors 43, 44 and 45 also receive pulse frequency inputs from error frequency generators 46, 47 and 48, respectively. The error frequency generators are operative to provide a pulse frequency output having a number of pulses in a given unit of time which is proportional to the position error detected by comparators 34, 35 and 36, respectively.

As will hereinafter be more fully described, the frequency selectors 43, 44 and 45 pass that frequency having the lower repetition rate to the axes servos. Initially, the feedrate frequency $f_p$ from feedrate frequency generator 40 will be the lower frequency. Then, as the position error detected by the comparators decreases, the repetition rate of the pulse frequency proportional to the error decreases and when this pulse frequency falls below that of the feedrate frequency generator the error frequency is passed.

Servo systems 11, 12 and 13 are of the pulse responsive type which move the machine part an incremental distance for each pulse received and at a velocity determined by the frequency of the received pulses.

FIGS. 2 and 3 illustrate in block form and in greater detail the relationship of the position and command registers for the X axis in relation to the comparator 34 and servo system 11. As previously mentioned, the command and position registers 23 and 31, respectively, are recirculating registers which hold a predetermined number of binary digits (bits) and a bit indicative of the sign of the number represented by the binary digits. The pulse counts from quantizer 27 are accumulated in an adder 50 and algebraically added to the number in position register 31 each recirculation cycle. The binary numbers in these registers recirculate every sixteen clock cycles (one recirculation cycle). Each recirculation cycle the numbers in the command register 23 and position register 31 are applied bit by bit to a subtractor 49 and the position is subtracted from the command to determine the error. The signs thereof are applied to an error sign detector 51 which determines if the subtraction involves a negative number and complementing is necessary. If complemented, the numerical result of the complementation is decomplemented in decomplementer 52. This yields a number indicative in magnitude of the error and with a sign indicative of the direction of movement with respect to the X axis. The numerical error is applied to a number-to-frequency converter 53 which also receives a plurality of binary frequencies $b_f$. Converter 53 may comprise a plurality of gates, each having one of the binary frequencies $b_f$ applied thereto. The converter 53 further comprises a binary number storage register which accepts the numerical error. Each stage of this register then is operative to gate one of the binary frequencies of a corresponding binary weight dependent upon the existence of a bit therein. A number-to-frequency converter of the described type is exemplified in the co-pending application of Johann Reuteler, Ser. No. 349,216, filed Mar. 4, 1964, assigned to the same assignee as the present invention.

Number-to-frequency converter 53 supplies a pulse frequency $f_e$ having a repetition rate proportional to the existing error, between the commanded position of part 14 and the actual position thereof. The pulse frequency output of number-to-frequency converter 53 is then applied to frequency selector 43 together with the feedrate pulse frequency $f_p$ from the feedrate frequency generator 40. Frequency selector 43 detects which is the lower frequency and passes the lower frequency to servo system 11.

When a new position command is inserted in command register 23, the error between the actual position and the commanded position will be the greatest at any time during this movement. Thereafter, as the part is moved, the actual position as exemplified by the numerical information in the position register 31 will move toward the numerical commanded position in command register 23. Therefore, at the outset of movement the error will be larger and, hence, the frequency output of number-to-frequency converter 53 will be greater. Then, as the error decreases the frequency output of number-to-frequency converter 53 will decrease. However, during initial movement and until the part 14 approaches the commanded position, the feedrate frequency $f_p$ from feedrate frequency generator 40 will have the lowest repetition rate and this frequency will be applied to the servo system. This frequency being constant, the part will move at a constant rate. As the part 14 approaches the commanded position, the error magnitude decreases and the frequency output of number-to-frequency converter 53 decreases accordingly. Then when the repetition rate of the output of number-to-frequency converter 53 falls below the repetition rate of the feedrate frequency, the last-mentioned frequency will be passed by frequency selector 43 and applied to servo system 11.

The servo system 11 may comprise a bi-directional counter 55 which receives as one input the frequency passed by lower frequency selector 43, and as a second input feedback pulses from quantizer 27. Thus, at any time a numerical count in the bi-directional counter 55 is indicative of the error between the instantaneous commanded position as determined by the number of pulses passed by lower frequency selector 43 (not the absolute commanded position as determined by the numerical count in register 23) and the feedback pulses received from quantizer 27. The accumulated number in counter 55 is converted to a pulse frequency by a number-to-frequency converter 56 which pulse frequency is applied to a servo amplifier 57 which may control a hydraulic valve which, in turn, controls the operation of a hydraulic motor 58 which will drive part 14. Alternatively, the amplifier 57 may exert suitable control over the field or armature circuit of an electric motor, which also would drive part 14.

For a more detailed explanation of a servo system of this type, reference may be had to the co-pending application of Johann Reuteler, Ser. No. 349,215, filed Mar. 4, 1964, and assigned to the same assignee as the present invention. It is to be understood that the invention may be used in conjunction with any type of pulse or digitally responsive servo system including those of the phase or frequency modulation type as shown in U.S. Patent 3,011,110.

From the arrangement described it will be apparent that the part 14 will move along one axis at a constant rate when movement is commanded, until the error as determined by the difference between the command position and the actual position decreases to a predetermined value. Then, in response to the error reaching such predetermined value, the repetition rate of the pulse frequency applied to servo system 11 decreases proportional to the decrease in the existing error so that the part 14 will slow down as it approaches the commanded end position and essentially eliminates the possibility of overshoot.

The lower frequency selectors 43, 44 and 45 are exemplified in schematic form in FIG. 6 which is described with prior reference to FIGS. 4a, 4b, 4c and FIG. 5.

FIG. 4 illustrates a well-known NOR circuit from which the lower frequency selectors may be constructed. The NOR circuit generally comprises a transistor 60 in the grounded emitter configuration having an output terminal 61 at the collector thereof, with the collector returned to a negative potential. The base is biased positive and may receive a plurality of signals through inputs 62.

When a negative going pulse is applied to one of the input terminals 62, output terminal goes to essentially ground potential. When there is no input, terminal 61 is at supply potential. In FIG. 6 this NOR circuit is illustrated as shown in FIG. 4b to exemplify a gating or coincidence circuit and is illustrated in FIG. 4c to show two NOR circuits cross-connected to form a bistable device commonly known as a flip-flop and hereinafter referred to as a memory.

FIG. 5 exemplifies the signals of clock oscillator 37 which generates four clock signals during one clock cycle. The zero level is hereinafter referred to as a low level signal and the one level is hereinafter referred to as a high level signal.

As exemplified in FIG. 6, the lower frequency selector comprises five memories, M1–M5 and five gates G1–G5. The error signal pulses $f_e$ from number-to-frequency converter 53 are applied to memory M1 and the feedrate pulses $f_p$ are applied to memory M2.

An $f_e$ pulse sets memory M1 which will set memory M3 one clock cycle later at C4 through gate G1. An $f_p$ pulse sets memory M2 which will set memory M4 through gate G3. The $f_e$ and $f_p$ pulses are negative going. The memories have a "true" output from their right side and a "false" output from their left side.

Memories M1–M5 are set when a negative going or high signal is applied to the left sides thereof and are reset when a negative going or high signal is applied to the right sides thereof.

When both of memories M3 and M4 are set and at clock pulse, C2, gate G5 will set memory M5. When memories M3 and M4 are set, they stay set until memory M5 allows them to be reset. When memory M5 is set it has a zero output from the left side thereof and it allows gates G2 and G4 to reset memories M3 and M4, respectively, at clock C4, except when memories M1 or M2 are set at the same time memory M5 is set. If memory M1 is set its input to G2 is high and G2 is blocked and M5 cannot reset M3. Similarly, if M2 is set its input to gate G4 is high. Memories M1 and M2 receive a resetting pulse C1, each clock cycle. However memories M3 and M4 which are reset through gates G2 and G4, respectively, may only be reset when memory M5 is set and has a low or zero output from the left side thereof. When memories M3 and/or M4 are set they signify that an $f_e$ or $f_p$ pulse has been received, respectively.

Memory M5 is set to produce output pulses only when memories M3 and M4 are set at C2. Memory M5 is then reset at C1. When memory M5 is reset it has a one level output from the left side thereof which inhibits gates G2 and G4. Therefore, memories M3 and M4 cannot be reset except when memory M5 is set. An exception to this is when memories M1 or M2 are set at the same time that memory M5 is set.

The operation of the circuit of FIG. 6 may best be understood by reference to FIG. 7 which shows the condition of the elements of FIG. 6 in response to error pulses $f_e$ and feedrate pulses $f_p$.

Assume now that the pulse frequencies $f_e$ and $f_p$ occur as shown in FIG. 7. In FIG. 7 the error frequency $f_e$ is shown as decreasing in repetition rate while the feedrate pulse frequency $f_p$ is shown as increasing in repetition rate. In FIG. 7 the memory waveforms shown are those at the right side thereof. Assume that both memories M1 and M2 are reset. The first $f_e$ pulse sets memory M1, and at C4 gate G1 sets memory M3. At this time memory M5 is reset and the one level output on line 63 thereof inhibits gate G2. Therefore, memory M3 cannot be reset. When the first $f_p$ pulse occurs, memory M2 is set, and at C4 gate G3 sets memory M4. The simultaneous set conditions of memories M3 and M4 are sensed by gate G5 which sets memory M5 at C2. Then memory M5 no longer inhibits gates G2 and G4 and these gates may be opened at C4 to reset memories M3 and M4. When memory M5 is reset at C1, a negative going output pulse is completed on line 64, as shown in FIG. 7.

At the second $f_e$ pulse, memory M1 is set, which sets memory M3 through gate G1. Memory M5 now inhibits gate G2 and memory M3 remains set. At this time, memory M1 may be reset by C1 and memories M2 and M4 are reset. The third and fourth $f_e$ pulses will again set memory M1 which is subsequently reset by C1. However, such setting of memory M1 has no effect on memories M2, M3 or M4. Upon the occurrence of the second $f_p$ pulse, memory M2 is set and through gate G3 sets memory M4 at C4. At the following C2, gate G5 is opened and memory M5 is set. This removes the inhibiting signal from gates G2 and G4 which at C4 reset memories M3 and M4 at C4. Memories M1, M2 and M5 are then reset at the next clock C1 pulse. It will be noted in FIG. 7 that this results in an output pulse from memory M5 on line 64. The second, third and fourth succeeding $f_e$ pulses set memory M1. However, this has no effect on memory M3 inasmuch as it is already set by the second $f_e$ pulse.

The third and fourth $f_e$ pulses also set memory M1 which is subsequently reset by C1. At the occurrence of the second $f_p$ pulse, memory M2 is set which sets memory M4 through gate G3. At this time, memories M3 and M4 are both set, gate G5 senses this condition, and at C2 sets memory M5 which is reset at C1 to produce the second output pulse, and further allows memories M3 and M4 to be reset at C4. At the fifth $f_e$ pulse, memories M1 and M3 are set as previously described and memory M5 inhibits gate G2. Therefore, memory M3 cannot be reset. Upon occurrence of the third $f_p$ pulse, memories M2 and M4 are set and gate G5 sets memory M5 which is reset at C1 to produce the third output pulse. During the occurrence of the third output pulse, both memories M3 and M4 will reset as previously described.

At this point it will be seen that an output pulse has been delivered from memory M5 upon occurrence of each $f_p$ pulse which has the lower frequency. It may be noted that the higher frequency pulses $f_e$, in effect, act as gating pulses to gate the lower frequency pulses through gate G5 upon occurrence thereof. Until this time the frequency $f_p$ has been less than frequency $f_e$. After the third $f_p$ pulse the feedrate frequency starts to increase while the error frequency starts to decrease.

The sixth $f_e$ pulse sets memories M1 and M3 as previously described and upon occurrence of the fifth $f_p$ pulse memory M5 delivers another output pulse and, again, all of memories M1–M5 are reset. Now memory M2 is set by the fourth $f_p$ pulse and memory M4 is set in response thereto. Gate G4 is inhibited by memory M5, thus memory M4 cannot be reset and remains in a set condition. Upon occurrence of the seventh $f_e$ pulse, memory M3 is set, gate G5 senses the setting of memories M3 and M4 at C2 and sets memory M5 which delivers the fifth output pulse. During this fifth output pulse, gates G2 and G4 would normally be opened by the output of memory M5. However, the sixth $f_p$ pulse occurs which sets memory M2. When this occurs the right side of memory M2 has a high or one level output which inhibits gate G4. Accordingly, gate G4 is not opened to reset memory M4, which remains set and will remain set until receipt of the eighth $f_e$ pulse to set memory M3.

From the foregoing it will be seen that the network of FIG. 6 passes the lower of two frequencies or, alternatively stated, generates an output pulse in response to each input pulse of the lower of two frequencies. Under normal operating circumstances, it will be understod that the feedrate pulses $f_p$ occur essentially uniformly spaced in time. However, in the foregoing example, the feedrate pulses have been shown as increasing in frequency to exemplify the ability of the lower frequency selecting network to select as between the lower of two frequencies.

In this manner, the machine part is moved first at a rate proportional to the frequency of the feedrate pulses $f_p$ and then when the error frequency $f_e$ decreases to less than the feedrate frequency, the machine part is moved at a decreasing velocity proportional to the frequency of the error pulses. In this manner, the velocity of the controlled part is maintained essentially constant throughout the great majority of its length of travel, and then is decelerated at a controlled rate as it approaches its commanded end point.

It may thus be seen that the objects of the invention set forth as well as those made apparent are efficiently attained. While a preferred embodiment of the invention has been set forth for purposes of disclosure, other embodiments thereof as well as modifications to the disclosed embodiment of the invention which do not depart from the scope of the invention may occur to others skilled in the art. Accordingly, the appended claims are intended to cover all embodiments of the invention which do not depart from the spirit and scope thereof.

What is claimed is:

1. In combination with a machine tool having a pulse responsive servo system adapted to move an object to a predetermined end point relative to a cutting tool during a cutting operation at a velocity proportional to the frequency of pulses received thereby, means for determining a numerical representation of the error between the position of the part and an end position of movement, means providing a numerical representation of a commanded velocity of movement of the part toward the end position, means for comparing the numerical representations, means responsive to said means for comparing for generating a train of pulses at a rate proportional to the smaller of said numerical representations and means for applying the train of pulses to the servo system.

2. The invention of claim 1 wherein a first pulse train is generated having a frequency proportional to the numerical representation of said error, a second pulse train is generated having a frequency proportional to the numerical representation of said desired velocity, and the pulse train having the lower frequency is selected and applied to said servo system.

3. The invention of claim 2 wherein a network receives the two pulse trains and generates a third pulse train having a frequency equal to the lower frequency of the two applied pulse trains.

4. The invention of claim 3 wherein said network comprises first and second bi-stable devices having two stable states of operation, means responsive to each pulse train for setting one of said devices in a first state upon receipt of a pulse of one of said trains, means for sensing when both of said devices are set in a first state, and means responsive to said means for sensing for generating an output pulse when both of said devices are set in a first state.

5. A network for selecting the lower frequency of two pulse trains comprising first and second bi-stable devices having two stable states of operation, means for setting each of said bi-stable devices in a first state upon receipt of a pulse of one of said trains, each of said devices being responsive to the pulses of one of said trains, means for sensing when both of said devices are set in a first state, and means responsive to said means for sensing for generating an output pulse when both of said devices are set in a first state.

6. The network of claim 4 further including means for preventing said devices from being reset to a second state after being set to a first state until both of said devices are set to a first state and an output pulse is generated.

7. In combination with a pulse responsive servo system arranged to move a part between two points at a velocity proportional to the frequency of pulses received thereby, means for determining the error between the position of the part and an end position of movement, means for generating a first plurality of pulses having a frequency proportional to the magnitude of the position error, means providing a second plurality of pulses having a frequency proportional to a desired velocity of movement of the part, and selection means for comparing the frequencies of the first and second plurality of pulses and applying the plurality of pulses having the lower frequency to the servo system.

8. The method of moving an object between two points using a pulse responsive servo system comprising, determining the position error between the position of the object and the end point of movement thereof, generating a first plurality of pulses having a frequency proportional to the magnitude of the position error, generating a second plurality of pulses having a frequency proportional to a desired velocity of movement of the object, comparing the frequencies of the first and second plurality of pulses, and applying the lower frequency plurality of pulses to the servo system.

References Cited
UNITED STATES PATENTS

| | | |
|---|---|---|
| 2,927,735 | 3/1960 | Scuitto. |
| 3,109,974 | 11/1963 | Hallmark. |
| 3,286,085 | 11/1966 | Rado. |
| 3,344,260 | 9/1967 | Lukens. |
| 3,349,229 | 10/1967 | Evans. |
| 3,418,547 | 12/1968 | Dudler _____ 318—138 X |
| 3,435,314 | 3/1969 | Bradley et al. _____ 318—138 |

THOMAS E. LYNCH, Primary Examiner

U.S. Cl. X.R.

318—608; 328—137; 307—233; 318—696

PO-1050
(5/69)

UNITED STATES PATENT OFFICE
CERTIFICATE OF CORRECTION

Patent No. 3,539,896　　　　　Dated November 10, 1970

Inventor(s)　　　J. F. Reuteler et al

It is certified that error appears in the above-identified patent and that said Letters Patent are hereby corrected as shown below:

Claim 6 - line 1 - after "claim" change "4" to -- 5 -- .

Signed and sealed this 23rd day of March 1971.

(SEAL)
Attest:

EDWARD M. FLETCHER, JR.　　　　　WILLIAM E. SCHUYLER, JR
Attesting Officer　　　　　　　　Commissioner of Patents